Feb. 24, 1931. G. C. BATZ 1,793,771
SOUND INSULATED SPRING CLIP
Filed March 13, 1930
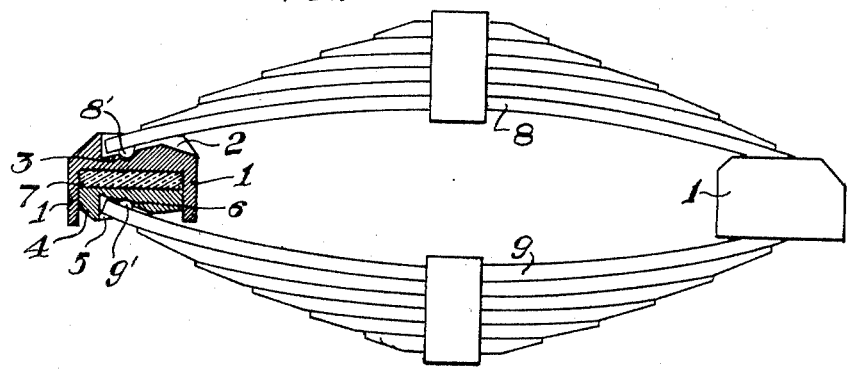
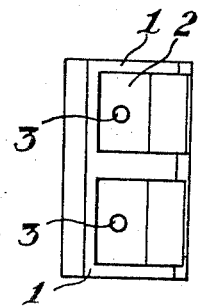
FIG.3.
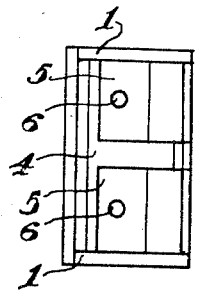
FIG.4.
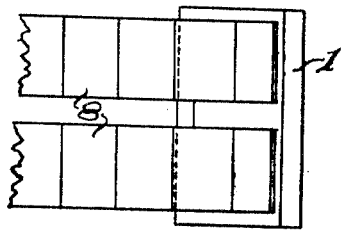
FIG.2.
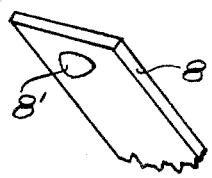
FIG.5.
INVENTOR.
George C. Batz.
BY
Byron D Cohn
ATTORNEY.

Patented Feb. 24, 1931

1,793,771

UNITED STATES PATENT OFFICE

GEORGE C. BATZ, OF TOPEKA, KANSAS

SOUND-INSULATED SPRING CLIP

Application filed March 13, 1930. Serial No. 435,486.

My invention relates to improvements in sound insulated spring clips for use with elliptical springs.

The object of my invention is to provide a means of sound insulation between the ends of the elliptical springs for railway coach trucks and their bearing points comprising a box-like structure of two parts slidably positioned to each other and each of the parts having seats therein for the ends of the springs, and the parts being separated from vertical contact by a cushion composed of rubber, cork, or any good sound deadening media, as will hereinafter be more fully explained.

Referring to the drawing, forming part of this specification, in which like characters apply to like parts in the different views:

Fig. 1 is an elevation of an elliptical spring of the type used on railway coach trucks showing the clips in position, one of the clips being shown in cross section.

Fig. 2 is a fragmentary plan view of the elliptical springs illustrating the position of the spring leaves on the clip.

Fig. 3 is a plan view of the upper portion of the cushioned spring clip.

Fig. 4 is a plan view of the lower portion of the spring clip.

Fig. 5 is a perspective view of the end of one of the lower leaves of the elliptical springs illustrating the hemispherical protrusions.

The spring clip illustrated, comprises a box-like structure 1, whose upper portion has the spring seats 2 in which are impressed the hemispherical depressions 3. A similar plurality of seats is formed into the lower portion or plate 4 having spring seats 5 and depressions 6.

The plate 4 is rectangular in shape and slidably engages the walls of the box 1 as shown. Interposed between the plate 4 and the corresponding portion of the box 1 is the cushion 7. The cushion 7 is composed of either rubber, cork or any good sound deadening media. The lower leaf of the spring 8 has at each end the hemispherical protrusions 8', formed to rest in the depressions 3 as illustrated in Fig. 2. The upper leaf of the spring 9 is formed in a similar manner having the hemispherical protrusions 9' arranged to fit the depressions 6.

The cushioned spring clip herein described is simple in construction and effective in operation and is one of the elements used in my improvements in sound insulated coach trucks shown and described in my application, Serial No. 360,429, filed May 4, 1929.

Such modifications may be employed as lie within the scope of the appended claim.

What I claim as new and desire to secure by Letters Patent is:

In a spring clip arranged to prevent the transmission of sound vibrations between the upper and lower portions of the elliptical springs on a railway coach truck in combination with one of the leaves of the spring portions, a metal box-like structure having seats on its upper portion to accommodate the lower leaf of the upper part of the spring, the seats having hemispherical depressions to correspond with hemispherical protrusions on the contacting surface of the spring leaf, a rectangular plate slidably mounted in the box and having seats and depressions similar to those in the upper portion of the said box-like structure, to accommodate the upper leaf of the lower portion of the spring, a rectangular cushion composed of sound deadening media interposed between the said plate and the opposing portion of the box-like structure for the purpose described.

In testimony whereof I affix my signature.

GEORGE C. BATZ.